US008400584B2

(12) United States Patent
Mifune

(10) Patent No.: US 8,400,584 B2

(45) Date of Patent: Mar. 19, 2013

(54) LIQUID CRYSTAL DISPLAY DEVICE HAVING A LIGHT GUIDE PLATE BEING FORMED IN A TRAPEZOIDAL SHAPE IN CROSS SECTION

(75) Inventor: Masayuki Mifune, Mobara (JP)

(73) Assignees: Hitachi Displays, Ltd., Chiba (JP); Hitachi Display Devices, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 294 days.

(21) Appl. No.: 12/370,900

(22) Filed: Feb. 13, 2009

(65) Prior Publication Data

US 2009/0207343 A1 Aug. 20, 2009

(30) Foreign Application Priority Data

Feb. 20, 2008 (JP) ................................ 2008-038697

(51) Int. Cl.

| | |
|---|---|
| ***G02F 1/1335*** | (2006.01) |
| ***G09F 13/04*** | (2006.01) |
| ***A47F 3/00*** | (2006.01) |
| ***F21V 7/04*** | (2006.01) |

(52) U.S. Cl. ............. 349/65; 349/62; 349/64; 362/97.1; 362/97.2; 362/608; 362/615; 362/561

(58) Field of Classification Search .................... 349/65, 349/62, 64; 362/97.1, 97.2, 561, 608, 615
See application file for complete search history.

(56) References Cited

U.S. PATENT DOCUMENTS

| | | | | |
|---|---|---|---|---|
| 6,139,162 | A * | 10/2000 | Masaki | 362/618 |
| 6,417,897 | B1 | 7/2002 | Hashimoto | |
| 2006/0055843 | A1 * | 3/2006 | Hahm et al. | 349/69 |
| 2007/0008457 | A1 * | 1/2007 | Takahashi et al. | 349/64 |
| 2007/0052880 | A1 * | 3/2007 | Lv et al. | 349/58 |
| 2008/0297459 | A1 * | 12/2008 | Sugimoto et al. | 345/102 |

FOREIGN PATENT DOCUMENTS

| | | | |
|---|---|---|---|
| JP | 08-313731 | * 11/1996 | |
| WO | WO-2005-068900 | * 7/2005 | 101/2 |

* cited by examiner

*Primary Examiner* — Lauren Nguyen

(74) *Attorney, Agent, or Firm* — Antonelli, Terry, Stout & Kraus, LLP.

(57) ABSTRACT

A backlight which arranges light emitting diodes on a side surface of light guide plate adopts the structure which allows the easy removal of the light guide plate from a mold and makes it difficult for a stress or the like to influence the fine structure of a light incident portion of the light guide plate. In a liquid crystal display device having a backlight which radiates light to a liquid crystal panel, LEDs which constitute a light emitting element are mounted on a light guide plate which is mounted on a backlight, and edge portions of the light guide plate are tapered such that a width of the light guide plate is increased in the removal direction of the side surface of the light guide plate. Further, an ejector-pin mark is formed on a lower surface of the light guide plate by pushing an ejector pin in the removal direction of the light guide plate.

13 Claims, 9 Drawing Sheets

LIQUID CRYSTAL DISPLAY DEVICE HAVING A LIGHT GUIDE PLATE BEING FORMED IN A TRAPEZOIDAL SHAPE IN CROSS SECTION

BACKGROUND OF THE INVENTION

1. Field of the Invention

The present invention relates to a light source of a non-self luminous display device, and more particularly to a liquid crystal display device having a backlight which includes a light guide plate and uses an LED as a light source.

2. Description of the Related Art

Recently, the liquid crystal display device has been popularly used as a display device. Particularly, the liquid crystal display device is used as a display part of portable equipment because the liquid crystal display device is thin and light-weighted, and consumes small electric power.

However, the liquid crystal display device is not a self-luminous-type display device and hence, the liquid crystal display device requires a lighting means. In general, as a lighting device which is used for the liquid crystal display device, a planar lighting device referred to as a backlight is popularly used. Although a cold cathode discharge tube has been used as a light emitting element (also referred to as a light source) of the backlight conventionally, an LED (light emitting diode) has been also recently used as the light emitting element.

The backlight includes a plate-shaped light guide plate. A material of the light guide plate is a light transmitting resin or the like, and light which is incident on the light guide plate from the light emitting element propagates in the inside of the light guide plate. A reflection/scattering member such as grooves, projections or a printed material is formed on the light guide plate, and the light which propagates in the inside of the light guide plate is directed and radiated toward a liquid-crystal-display-device side due to such a reflection/scattering member.

As a method of forming a light guide plate using a resin, there has been known a method which forms a light guide plate by filling a molten resin into a mold by injection molding. For example, JP-A-2005-103825 discloses a technique on a resin filling port for manufacturing a light guide plate by injection molding with high accuracy. However, JP-A-2005-103825 neither discloses nor suggests a manufacturing method of a light guide plate with respect to a case that the light guide plate has a small thickness.

Further, JP-A-08-313731 discloses a drawback on abnormal emission of light generated by a mark which is formed by an ejector pin for removing a light guide plate from a mold, and a shape of the ejector pin mark which can cope with the abnormal emission of light. However, JP-A-08-313731 neither discloses nor suggests the removal direction of the light guide plate and a shape of the light guide plate.

SUMMARY OF THE INVENTION

To realize a liquid crystal display device having a small thickness, a backlight is also required to have a small thickness. To reduce a thickness of the backlight, it is necessary to further reduce a thickness of the light guide plate. When the thickness of the light guide plate becomes smaller, however, the removal of the light guide plate from a mold becomes more difficult. Particularly, in manufacturing such light guide plates on a mass-production basis, it is difficult to form the light guide plate using a resin by injection molding with high accuracy and to remove the light guide plate from a mold without generating a stress or the like in the light guide plate. Accordingly, it has been difficult to obtain a light guide plate by forming a plate having a small thickness and stable quality by molding.

The present invention has been made under such circumstances and, it is an object of the present invention to provide a liquid crystal display device which can overcome the above-mentioned drawbacks.

According to one aspect of the present invention, in a liquid crystal display device including a liquid crystal panel and a planar lighting device which radiates light to the liquid crystal panel, the planar lighting device includes a light guide plate having a light radiation surface and a bottom surface which faces the light radiation surface in an opposed manner. Further, the light guide plate includes side surfaces which intersect the light radiation surface and the bottom surface respectively. A plurality of LEDs is arranged along the first side surface of the light guide plate. Light from the LEDs is incident on the light guide plate from the first side surface and hence, the first side surface forms a light incident surface of the light guide plate. The light incident on the light guide plate is directed toward a light-radiation-surface side by a scattering member formed on the bottom surface of the light guide plate, and is radiated from the light radiation source.

A width of the light radiation surface is set larger than a width of the bottom surface of the light guide plate thus forming the light guide plate having a trapezoidal shape. The light guide plate can be removed from the mold by pushing the bottom surface with an ejector pin. Further, an ejector pin mark which is formed on the bottom surface is chamfered thus suppressing undesired emission of light.

The light plate has a trapezoidal shape such that a width of the light guide plate is gradually increased in the removing direction thereof and hence, the light guide plate can be easily removed from the mold. Further, by chamfering the ejector pin mark, it is possible to suppress the undesired emission of light.

DETAILED DESCRIPTION OF THE EMBODIMENT

Hereinafter, an embodiment of the present invention is explained in detail in conjunction with attached drawings. Here, in all drawings for explaining the embodiment, parts having identical functions are given same symbols and their repeated explanation is omitted.

Figure 1:
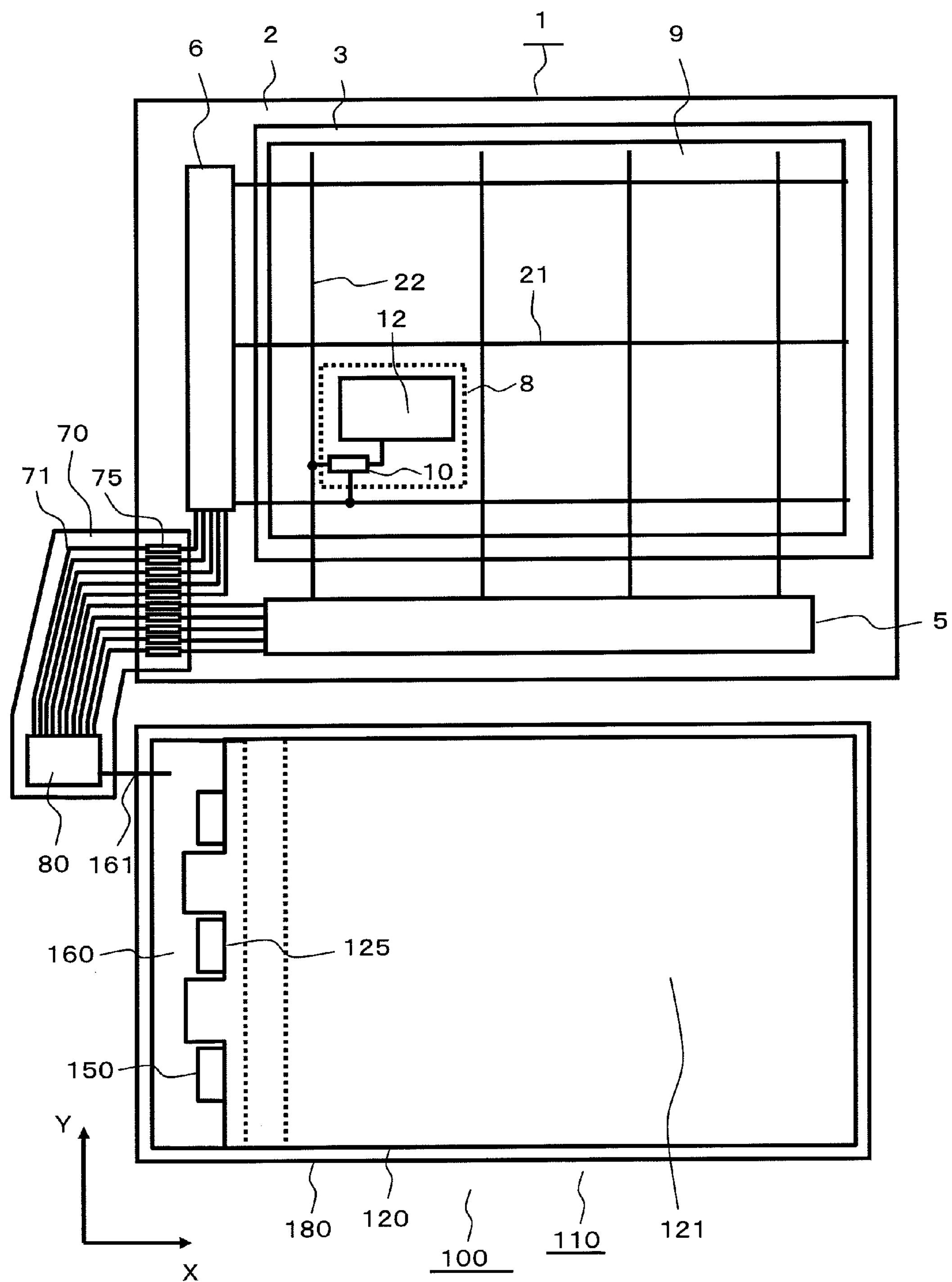
FIG. 1 is a block diagram showing the schematic constitution of a liquid crystal display device of an embodiment according to the present invention.

FIG. 1 is a plan view showing a liquid crystal display device 100 according to the present invention. The liquid crystal display device 100 is constituted of a liquid crystal panel 1, a backlight 110 and a control circuit 80. Signals and power source voltages necessary for a display of the liquid crystal display device 100 are supplied from the control circuit 80. The control circuit 80 is mounted on a flexible printed circuit board 70, and signals are transmitted to the liquid crystal panel 1 via lines 71 and terminals 75.

The backlight 110 is constituted of a light guide plate 120, LEDs 150 and a housing casing 180. The backlight 110 is provided for radiating light to the liquid crystal panel 1. The liquid crystal panel 1 performs a display by controlling a transmission quantity or a reflection quantity of light radiated from the backlight 110. Here, the backlight 110 is mounted on a back-surface side or a front-surface side of the liquid crystal panel 1 in a stacked manner as viewed from a viewer. However, in FIG. 1, to facilitate the understanding of the constitution of the liquid crystal display device, the backlight 110 is shown in a state that the backlight 110 is arranged parallel to the liquid crystal panel 1.

The light guide plate 120 has a substantially rectangular shape, and the LEDs 150 are arranged on the side surface thereof. Numeral 160 indicates a flexible printed circuit board which electrically connects the plurality of LEDs 150 with each other. The flexible printed circuit board 160 and the control circuit 80 are electrically connected with each other by lines 71.

A side surface 125 on which the LEDs 150 are arranged is referred to as a light incident surface or a light entering surface, and the light is incident on the light guide plate 120 from the light incident surface 125. The light incident on the light guide plate 120 is radiated from a light radiation surface 121. Here, a shape of the light guide plate 120 is explained in detail later.

Next, the liquid crystal panel 1 is explained. The liquid crystal panel 1 includes two substrates consisting of a TFT substrate 2 and a color filter substrate 3 which overlap with each other, and the liquid crystal composition sandwiched between these two substrates. A pixel electrode 12 is provided to each pixel portion 8 of the TFT substrate 2. Here, although the liquid crystal panel 1 includes a large number of pixel portions 8 arranged in a matrix array, to prevent the drawing from becoming complicated, only one pixel portion 8 is shown in FIG. 1. The pixel portions 8 arranged in a matrix array form a display region 9, each pixel portion 8 plays a role of a pixel of a displayed image, and an image is displayed in the display region 9.

In FIG. 1, gate signal lines (also referred to as scanning lines) 21 which extend in the x direction and are arranged parallel to each other in the y direction in the drawing, and drain signal lines (also referred to as video signal lines) 22 which extend in the y direction and are arranged parallel to each other in the x direction in the drawing are provided. The gate signal lines 21 and the drain signal lines 22 intersect each other. Further, each pixel portion 8 is formed in a region surrounded by the gate signal lines 21 and the drain signal lines 22.

A switching element 10 is provided to the pixel portion 8. A control signal is supplied to the switching element 10 via the gate signal line 21 so as to control an ON/OFF state of the switching element 10. When the switching element 10 is turned on, a video signal transmitted via the drain signal line 22 is supplied to the pixel electrode 12.

The drain signal lines 22 are connected to a drive circuit 5, and the video signals are outputted to the drain signal lines 22 from the drive circuit 5. The gate signal lines 21 are connected to a drive circuit 6, and the control signals are outputted to the gate signal lines 21 from the drive circuit 6. Here, the gate signal lines 21, the drain signal lines 22, the drive circuit 5 and the drive circuit 6 are formed on the same TFT substrate 2. Further, in addition to the drive circuit 5 and the drive circuit 6, the control circuit 80 can be formed on one semiconductor chip.

Figure 2A:
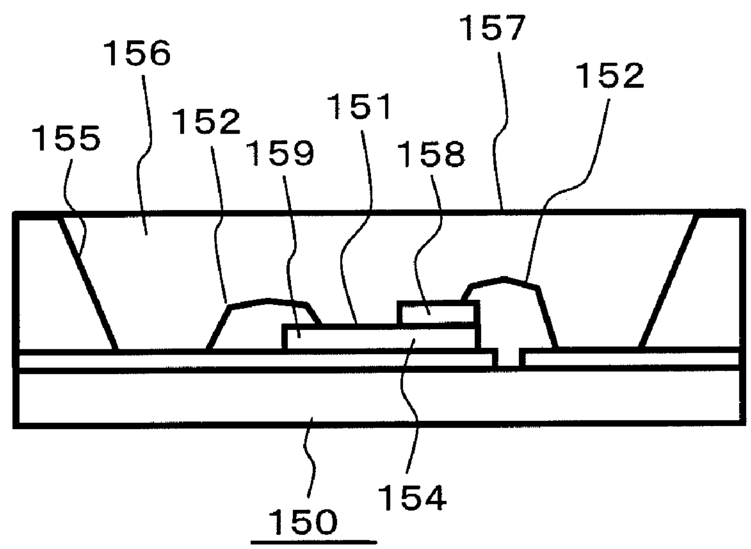
FIG. 2A and FIG. 2B are schematic views showing a light emitting diode of the liquid crystal display device of the embodiment according to the present invention.
Figure 2B:
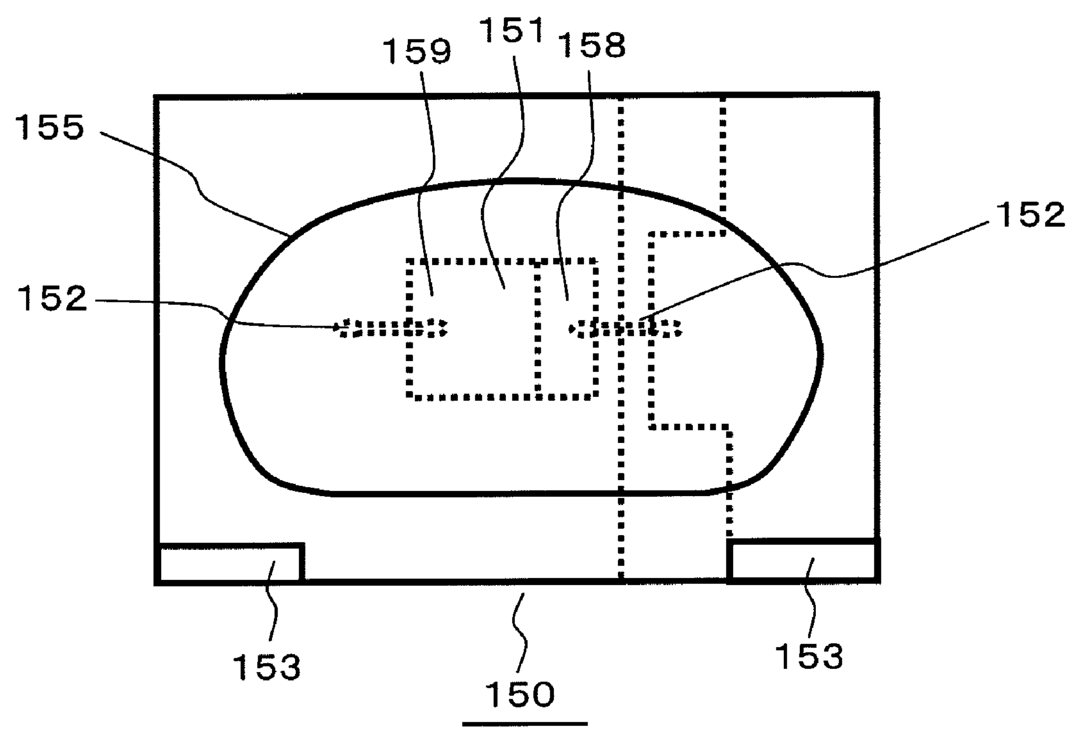

Next, FIG. 2A and FIG. 2B are schematic views showing the LED 150 which constitutes a light emitting element, wherein FIG. 2A is a schematic cross-sectional view of the LED 150, and FIG. 2B is a front view of the LED 150 as viewed from a light-emission side.

The LED 150 is configured such that an LED chip 151 which constitutes a light emission portion is mounted on a chip substrate 154. The LED chip 151 has a pn junction and, when a voltage is applied to the pn junction, the LED chip 151 emits light at a specified wavelength. A p electrode (anode) 158 is formed on a p-type semiconductor layer which forms the pn junction, and an n electrode (cathode) 159 is formed on an n-type semiconductor layer which forms the pn junction.

Wires 152 are respectively connected to the p electrode 158 and the n electrode 159. Chip terminals 153 are provided for connecting the LED 150 to an external portion, and the chip terminals 153 are electrically connected with the p electrode 158 and the n electrode 159 using the wires 152.

A fluorescent light emission part 156 may be arranged on a light-radiation-surface side of the LED chip 151. The fluorescent light emission part 156 has a function of converting a wavelength of light emitted from the LED chip 151. Numeral 155 indicates a reflection portion, and the reflection portion 155 reflects light toward a front side.

Figure 3A:
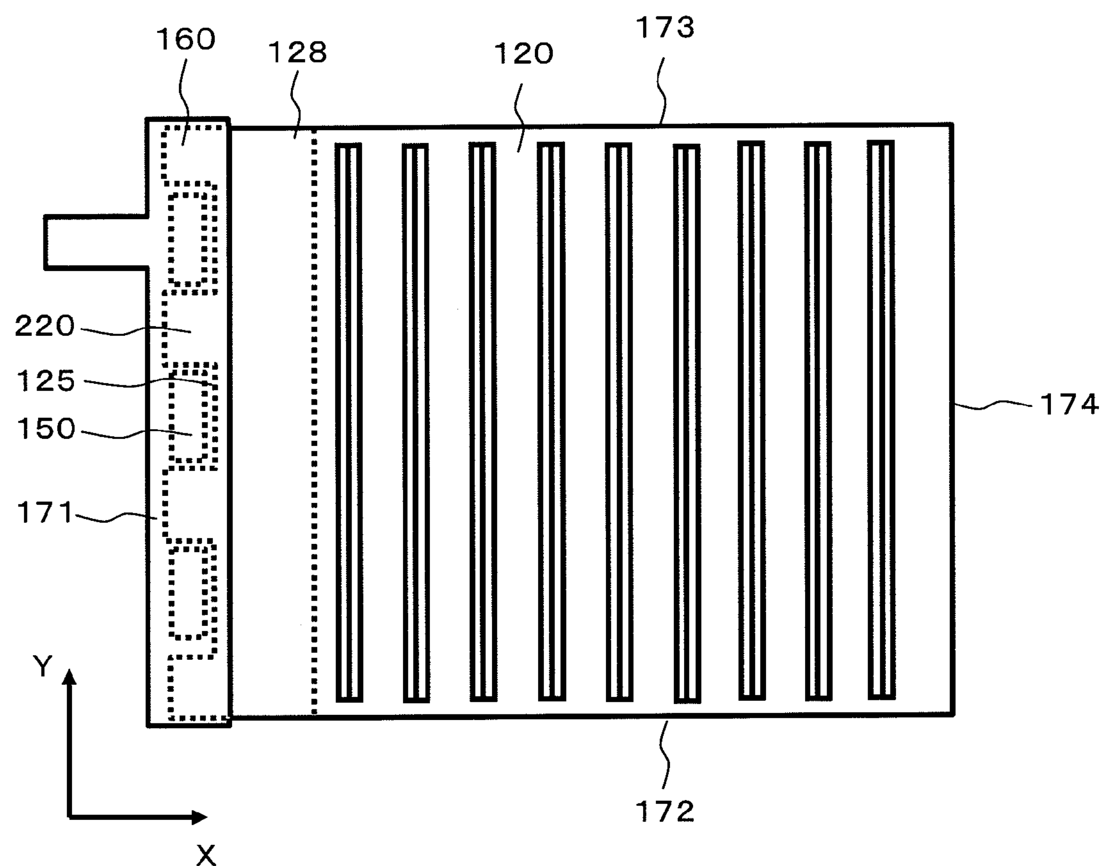
FIG. 3A and FIG. 3B are schematic views showing a light guide plate of the liquid crystal display device of the embodiment according to the present invention.
Figure 3B:
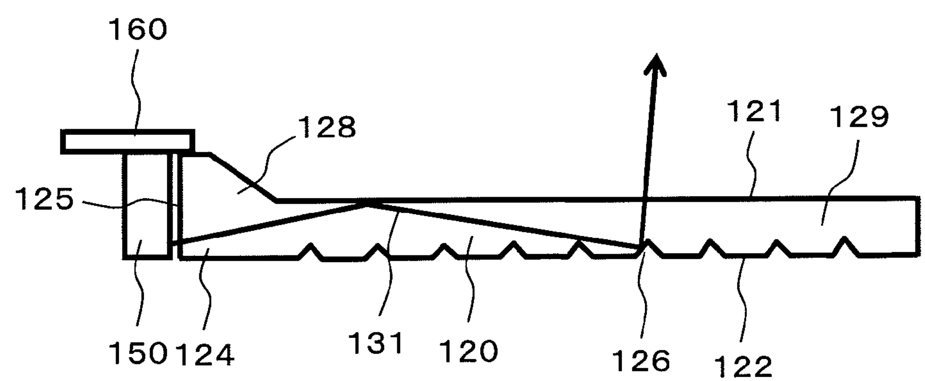

Next, FIG. 3A is a schematic plan view of the light guide plate 120, and FIG. 3B is a schematic side view of the light guide plate 120. As shown in FIG. 3A, the light guide plate 120 is formed in an approximately rectangular shape. As shown in FIG. 3B, the light guide plate 120 includes an upper surface (also referred to as a light radiation surface) 121 and a lower surface 122. In FIG. 3A, a side 171 constitutes a surface on which the LED 150 or the like are mounted. The light guide plate 120 is made of a material such as an acrylic resin which allows light to pass therethrough. The light guide plate 120 is formed in a plate shape, and a thickness of the light guide plate 120 is set to 0.2 mm to 1.0 mm.

In FIG. 3B, while the light guide plate 120 has an approximately rectangular cross-sectional shape, an inclined surface 128 which extends toward the light radiation surface 121 from the light incident surface 125 is formed on the light guide plate 120. The inclined surface 128 is effective when a thickness of the LEDs 150 is larger than a thickness of the light radiation surface 121. The inclined surface 128 guides light incident from the light incident surface 125 having a thickness larger than a thickness of the light radiation surface 121 toward the light radiation surface 121.

In FIG. 3A and FIG. 3B, the positional relationship among the light guide plate 120, the LED 150 and the flexible printed circuit board 160 is shown. On at least one side of the light guide plate 120, the light incident surface 125 is arranged and, in the vicinity of the light incident surface 125, a plurality of LEDs 150 is arranged. The LEDs 150 are arranged below the flexible printed circuit board 160 and along the light incident surface 125.

An adhesive sheet 190 (not shown in the drawing) is arranged on a light-guide-plate-120 side of the flexible printed circuit board 160. By adhering and fixing the flexible printed circuit board 160 to the light guide plate 120, a position of the LEDs 150 is adjusted with respect to the light incident surface 125.

Next, light 131 which is emitted from the LED 150 is explained in conjunction with FIG. 3B. The light 131 emitted from the LED 150 is incident on the light guide plate 120 from the light incident surface 125. A refractive index of the light guide plate 120 is larger than a refractive index of air and hence, light which reaches the light incident surface 125 at an angle larger than a specified angle with respect to the direction perpendicular to the light incident surface 125 is reflected on the light incident surface 125, while light which reaches the light incident surface 125 at an angle smaller than the specified angle with respect to the direction perpendicular to the light incident surface 125 enters the inside of the light guide plate 120.

The upper surface 121 and the lower surface 122 of the light guide plate 120 are arranged to be substantially orthogonal to the light incident surface 125, and the light which enters the inside of the light guide plate 120 advances in the inside of the light guide plate 120 while repeating the total reflection between the upper surface 121 and the lower surface 122 of the light guide plate 120. Grooves 126 having a V-shaped cross section are formed in the lower surface 122 as reflection portions. Apart of the light which advances in the light guide plate 120 is reflected toward the upper-surface-121 side on the grooves 126 formed in the lower surface 122, and is radiated from the upper surface 121. Here, the explanation is made with respect to a case in which the reflection portion is formed of the grooves 126 having a V-shaped cross section as one example. However, any reflection portion may be used provided that the reflection portion has a function of directing the light which advances in the inside of the light guide plate toward the upper-surface-121 side. White dots formed by printing or the like may be used as the reflection portions.

Figure 4A:
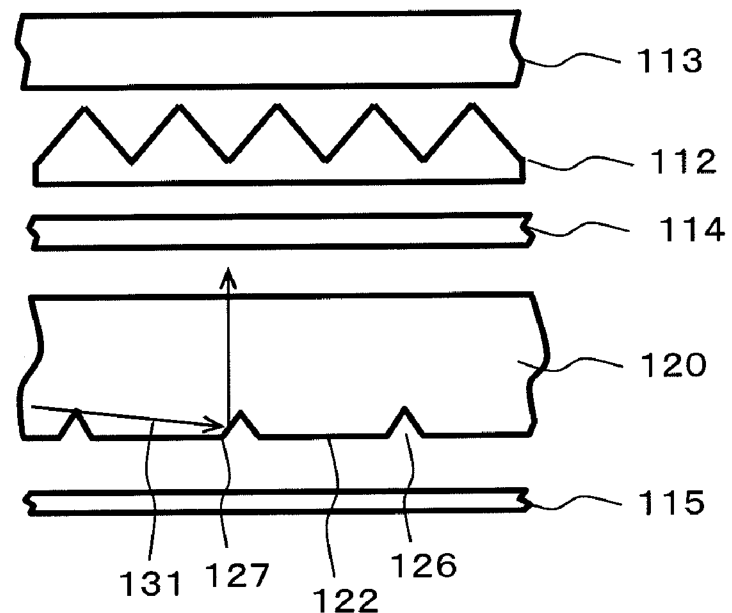
FIG. 4A and FIG. 4B are schematic cross-sectional views showing the light guide plate of the liquid crystal display device of the embodiment according to the present invention.
Figure 4B:
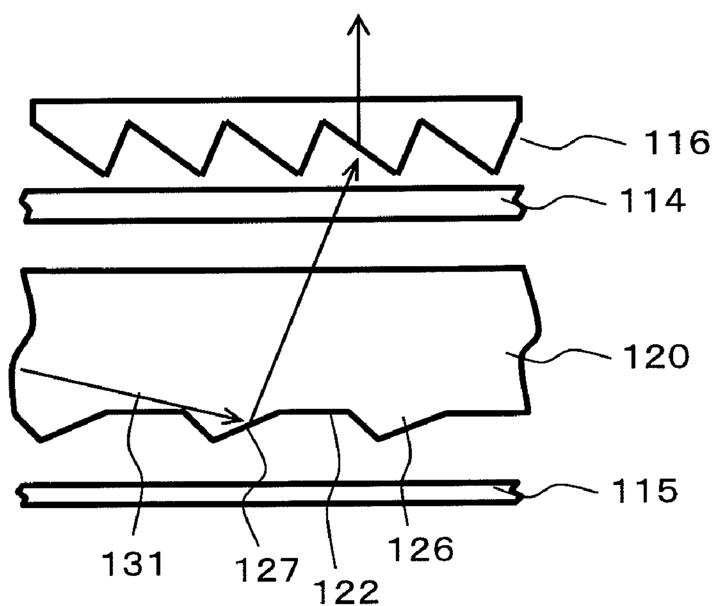

Next, the light which is reflected on the grooves 126 is explained in conjunction with FIG. 4A and FIG. 4B. FIG. 4A shows a case in which the grooves 126 are recessed inwardly, while FIG. 4B shows a case in which the grooves 126 project outwardly. Each groove 126 includes a reflection surface (also referred to as an inclined surface) 127, wherein the reflection surface 127 makes an angle of 1 to 35 degrees with respect to the lower surface 122. The light which is reflected on the reflection surface 127 is reflected toward the upper surface 121 of the light guide plate 120. By reflecting the light on the reflection surface 127, it is possible to set an angle of light with respect to the upper surface 121 to an angle which allows the radiation of light from the upper surface 121. That is, although the light repeats the total reflection in the inside of the light guide plate 120 as described above, due to the formation of the reflection surfaces 127, the angle of the light with respect to the upper surface 121 becomes an angle which allows the radiation of light from the upper surface 121 so that the light radiates from the light guide plate 120.

As shown in FIG. 4A, prism sheets 112, 113 are arranged on the upper surface 121 of the light guide plate 120 so as to control the direction of light radiated from the light guide plate 120. Here, in FIG. 4A, the prism sheets 112, 113 are arranged in a state that ridges of triangular columns of the prism sheet 112 and ridges of triangular columns of the prism sheet 113 intersect each other. Accordingly, the prism sheet 113 can refract the advancing direction of light which is radiated from the light guide plate 120 in the lateral direction thus directing the light toward the inside (liquid-crystal-panel side). Here, numeral 114 indicates a diffusion plate, and numeral 115 indicates a reflection sheet.

Next, FIG. 4B shows a case in which one sheet of asymmetric prism sheet is used. The light which is reflected on the reflection surface 127 makes an obtuse angle with respect to the perpendicular direction of the upper surface 121, and the light is radiated from the upper surface 121 such that the light expands outwardly (toward a right side in the drawing). On the light guide plate 120, an asymmetrical prism sheet 116 is formed so as to refract the outgoing light toward a liquid-crystal-panel (not shown in the drawing) side.

Figure 5:
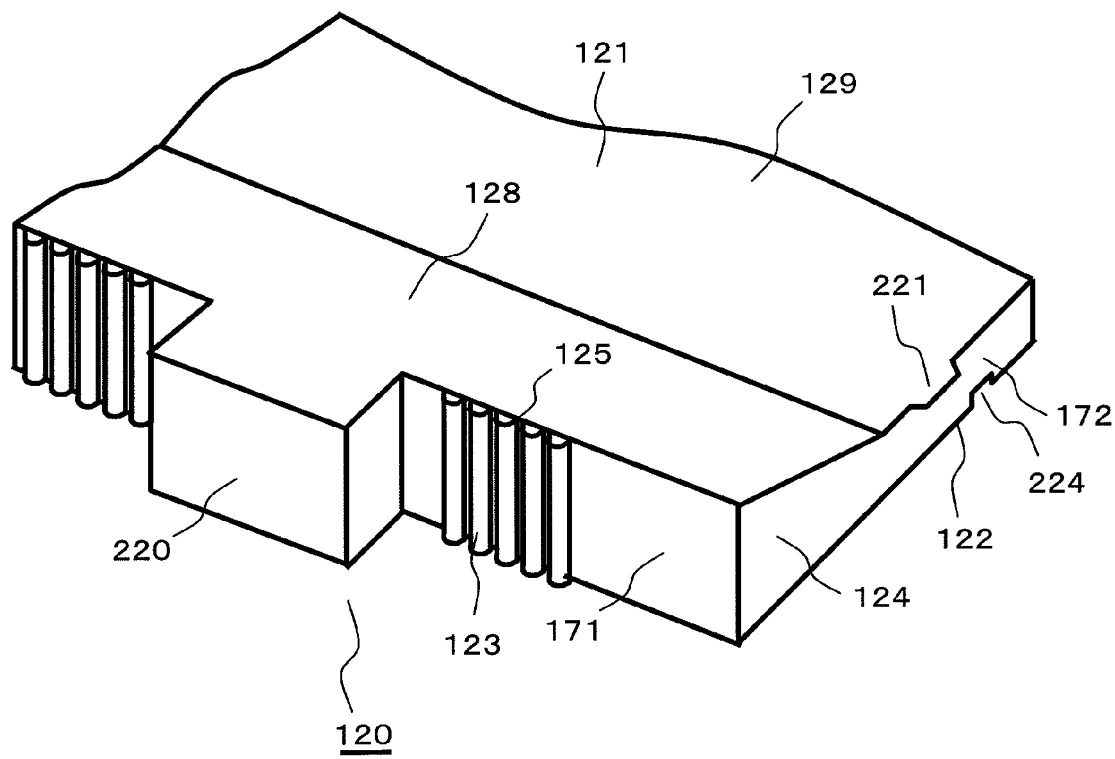
FIG. 5 is a schematic perspective view showing a portion of the light guide plate of the liquid crystal display device of the embodiment according to the present invention.

FIG. 5 is a perspective view showing the vicinity of the light incident surface 125 of the light guide plate 120. Lenses 123 are formed on the light incident surface 125 of the light guide plate 120. The lenses 123 have a function of scattering light incident from the light incident surface 125. The light incident from the light incident surface 125 is guided to the light radiation surface 121 by way of the inclined surface 128. A projecting portion 220 is formed between the neighboring lenses in a state that the projecting portion 220 projects from the light incident surface 125. The light incident portion 124 is formed of the light incident surface 125, the lenses 123, the projecting portions 220, the inclined surface 128 and the like.

When the light guide plate 120 is made thin, a thickness of the LED 150 becomes larger than a thickness of the light guide plate 120 defined between the upper surface 121 and the lower surface 122. Accordingly, a thickness of the light guide plate 120 at the light incident surface 125 is set large so as to form the inclined surface 128 thus enabling guiding of the light toward the light-radiation-portion-129 side.

The light is radiated toward a liquid-crystal-panel side from the upper surface 121. To satisfy a demand for further reduction of a thickness of the light guide plate 120, a thickness of the light guide plate 120 at the light radiation portion 129 is steadily reduced. However, when a distance between the upper surface 121 and the lower surface 122 becomes 1 mm or less, it is difficult to fill a resin into a mold at the time of manufacturing the light guide plate by injection molding.

Further, a mark which appears when the light guide plate 120 is pushed by an ejector pin (hereinafter referred to as an ejector pin mark) 224 is formed on the lower surface 122 of the light guide plate 120 and has a concave shape as shown in FIGS. 5, 8, 9A and 9B. As described above, portions having a complicated shape such as lenses 123 are formed on the light guide plate 120 in the vicinity of the light incident surface 125 and hence, there exists a drawback that when the light guide plate 120 is removed from the mold, a stress is generated in the light guide plate 120. Here, numeral 221 indicates a fixing projection formed on the light guide plate 120.

Figure 6A:
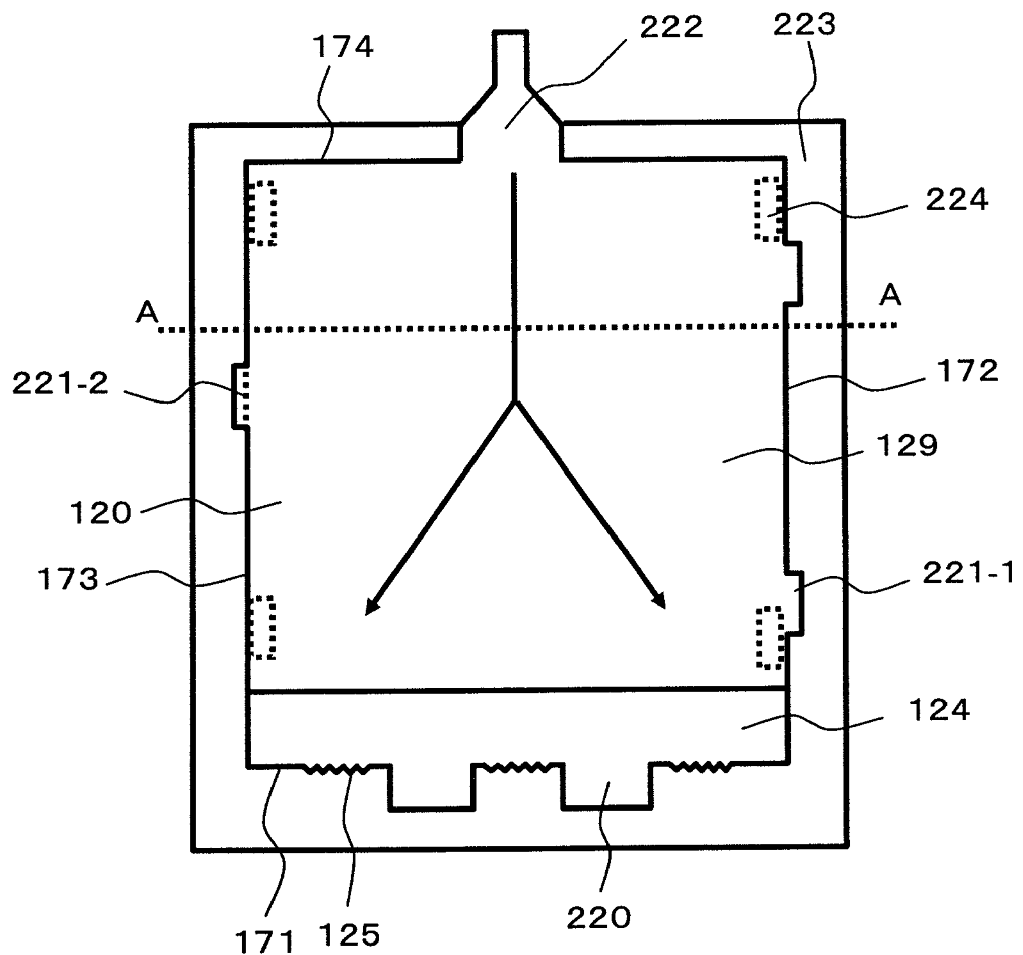
FIG. 6A is a schematic plan view showing a method of forming the light guide plate of the liquid crystal display device of the embodiment according to the present invention.
Figure 6B:
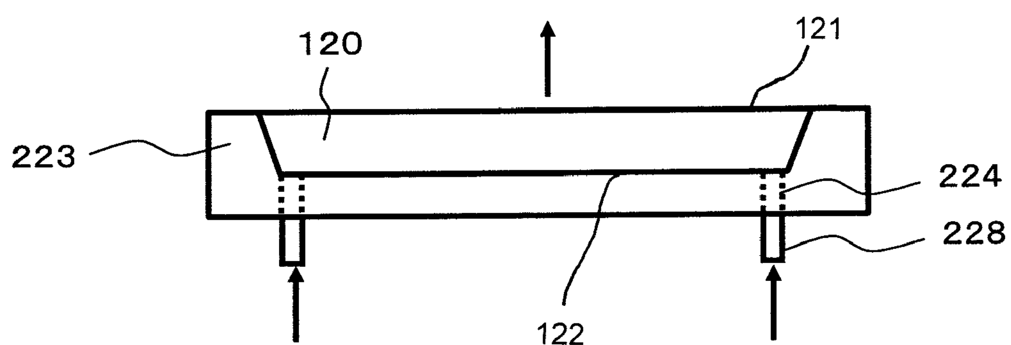
FIG. 6B is a schematic cross-sectional view showing the method of forming the light guide plate of the liquid crystal display device of the embodiment according to the present invention.

FIG. 6A show the manner of operation of filling the resin into the mold 223, wherein FIG. 6A is a schematic plan view of the mold 223. FIG. 6B show the manner of ejecting the light guide plate 120 from the mold 223, and FIG. 6B is a schematic cross-sectional view taken along a line A-A in FIG. 6A. The resin is filled into the inside of the mold under pressure from the outside through a filling port 222. The resin which is filled through the filling port 222 advances in a space formed in the mold 223 as indicated by an arrow in the drawing.

As shown in FIG. 6, when the filling port 222 is formed in a side-surface-174-side of the mold 223 which faces the light incident surface 125 in an opposed manner, the resin firstly advances in a portion of the space formed in the mold 223 corresponding to the light radiation portion 129 where a distance between the upper surface 121 and the lower surface 122 is approximately uniform. In the portion of the space corresponding to the light radiation portion 129, a pressure which pushes the resin forward is uniformly applied to the resin and hence, the resin spreads uniformly in the space formed in the mold 223.

Figure 7:
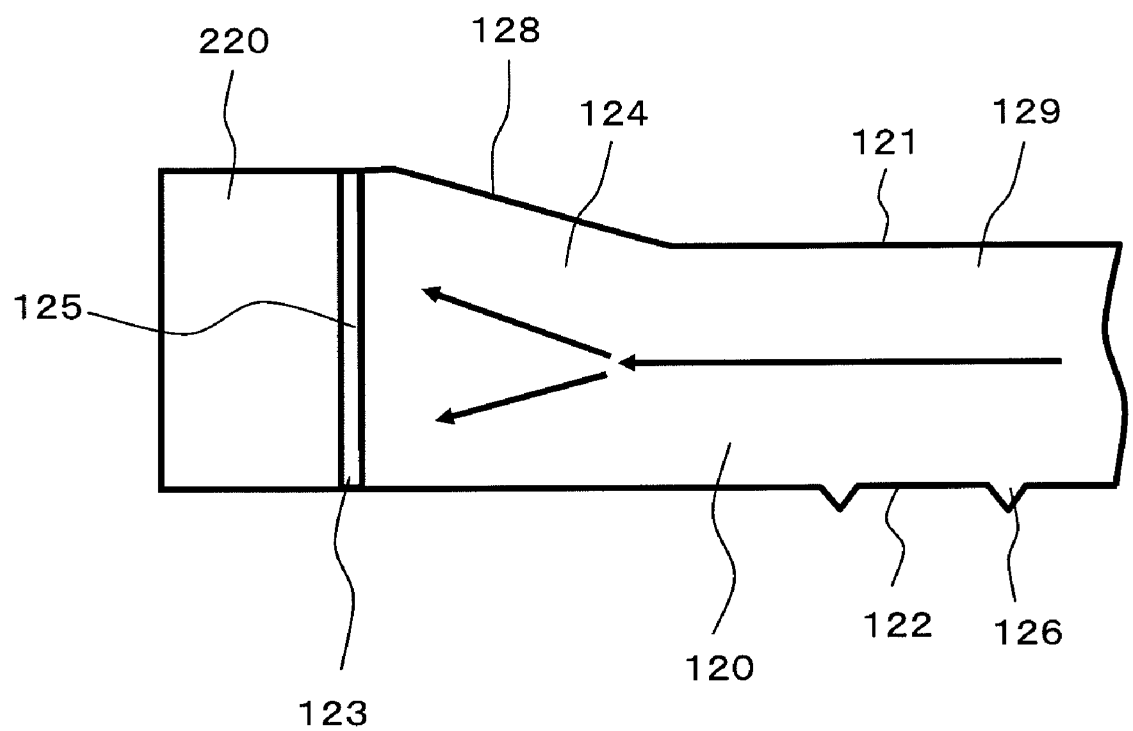
FIG. 7 is a schematic cross-sectional view showing the vicinity of a light incident portion of the light guide plate of the liquid crystal display device of the embodiment according to the present invention.

When the resin reaches a portion of the space formed in the mold corresponding to the light incident portion 124, since the light guide plate 120 is formed such that a thickness of the light guide plate 120 at the inclined surface 128 is gradually increased as shown in FIG. 7, a pressure applied to the resin in the portion of the space corresponding to the light incident portion 124 is decreased compared to a pressure applied to the resin in the portion of the space corresponding to the light radiation portion 129. Further, when a flow distance of the resin from the filling port 222 is elongated, the resin is hardened thus making the transfer of a shape of the mold to the resin with high accuracy difficult. Further, the lenses 123 and the projecting portions 220 are formed on the light incident portion 124 so that the shape of the light incident portion 124 is complicated and hence, the transfer accuracy of the shape of the mold is also lowered from this aspect.

The shape of the lens 123 which is formed on the light incident portion 124 influences the advancing direction of light which is incident on the lens 123 and hence, the formation of the lens 123 particularly requires high accuracy. However, since the shape of the lens 123 is fine compared to a shape of the projecting portion 220 and the like, it is basically difficult to transfer the shape of the mold to the resin with high accuracy.

Further, as shown in FIG. 6A and 6B, when the filling port 222 is formed in the side-surface-174 side of the mold 223, the ejector pin 228 for removing the light guide plate 120 from the mold is formed on portions of the mold 223 in the vicinity of the side surface 172 and the side surface 173. Accordingly, the ejector pin mark 224 is also formed in the vicinity of the side surface 172 and the side surface 173.

By forming the ejector pin 228 in the vicinity of the side surface 172 and the side surface 173, it is possible to prevent the light incident portion 124 from being influenced by a stress generated by pushing the ejector pins 228.

Further, by forming the shape of the light guide plate 120 such that a width of the upper surface 121 is set larger than a width of the lower surface 122, the light guide plate 120 can be easily removed from the mold 223. That is, although the shape of the light guide plate 120 has a substantially rectangular shape in appearance, the width of the upper surface 121 is set larger than the width of the lower surface 122 and hence, the light guide plate 120 is substantially formed in a trapezoidal shape in cross section as shown in FIG. 6B. Accordingly, by pushing the lower surface 122 with the ejector pins 228 in the direction indicated by an arrow, the light guide plate 120 can be easily removed from the mold 223 in the direction indicated by an arrow. Here, the ejector pin marks 224 remain on the lower surface 122.

Figure 8:
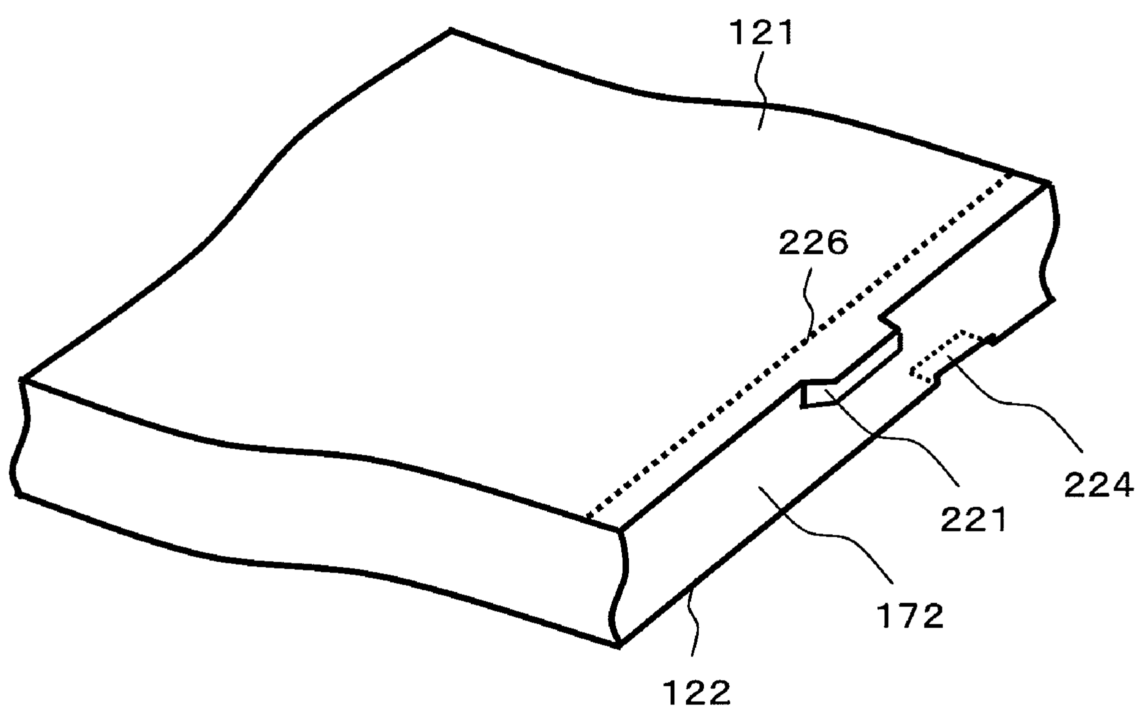
FIG. 8 is a schematic perspective view showing a shape of a side surface of the light guide plate of the liquid crystal display device of the embodiment according to the present invention.

FIG. 8 is a view showing the light guide plate 120 which forms the fixing projection 221 on a side surface 172 thereof. The fixing projection 221 is provided for fixedly mounting the light guide plate 120 in the inside of the backlight. By fitting the fixing projection 221 in a recessed portion formed in the inside of the backlight, the light guide plate 120 can be fixedly mounted in the inside of the backlight.

As described previously, the light guide plate 120 is thin, that is, has a thickness which falls within a range from 0.2 mm to 1.0 mm. Accordingly, the fixing projection 221 formed on the side surface 172 is formed in a fine shape. Further, as shown in FIG. 6, the fixing projection 221 projects in the direction opposite to the flow direction of the resin and hence, there exists a drawback that it is difficult to uniformly apply the pressure to the resin to be filled in a portion of the space of the mold for forming the fixing projection 221.

Figure 9A:
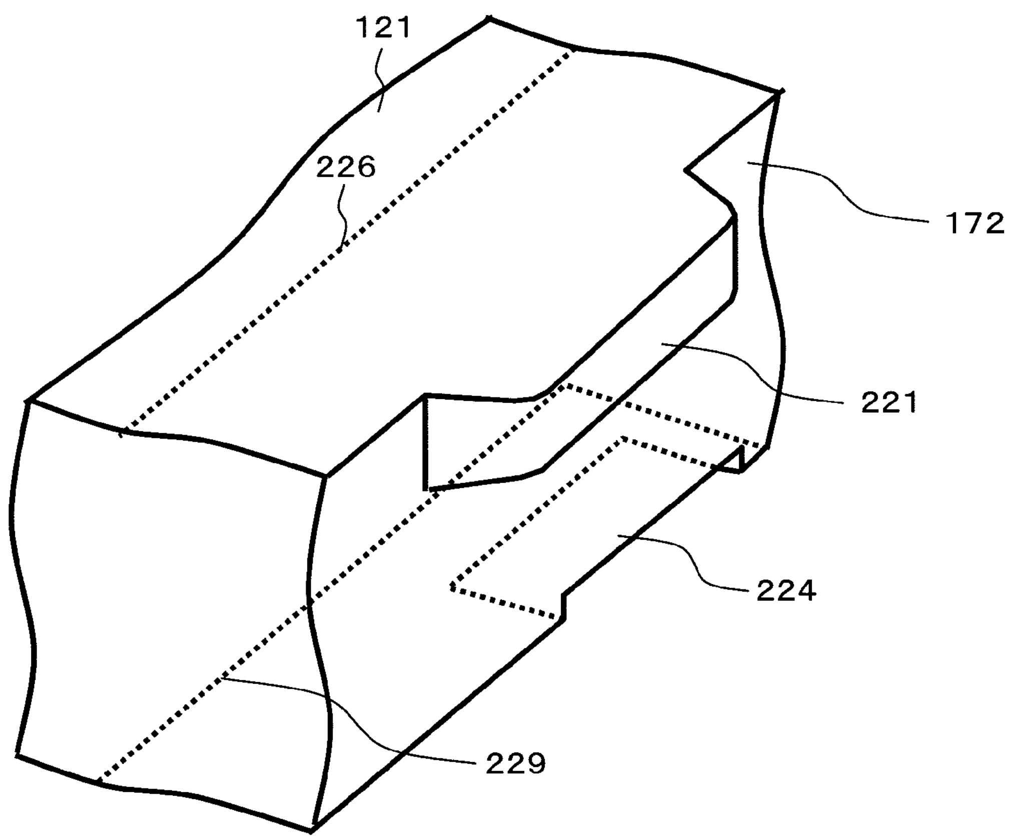
FIG. 9A is a schematic perspective view showing a shape of the side surface of the light guide plate of the liquid crystal display device of the embodiment according to the present invention.
Figure 9B:
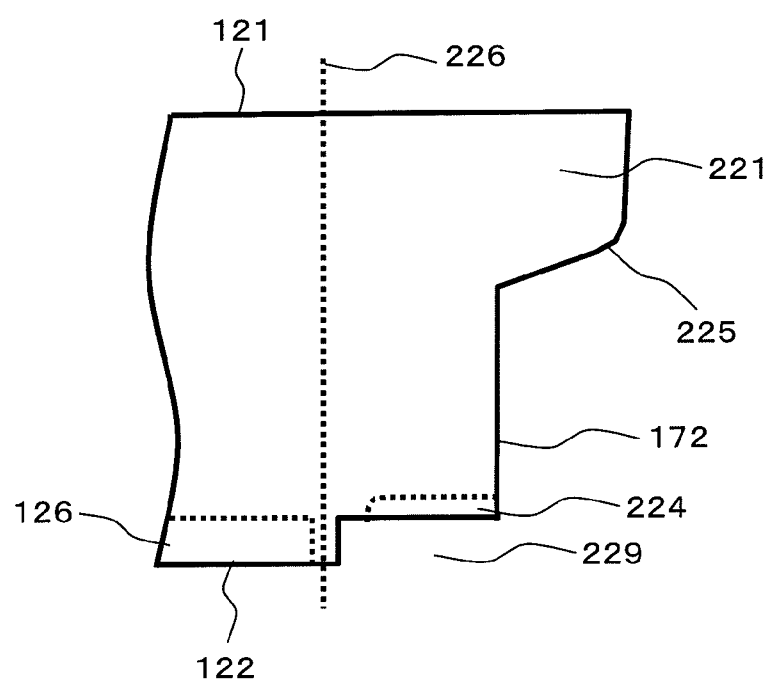
FIG. 9B is a schematic cross-sectional view showing the shape of the side surface of the light guide plate of the liquid crystal display device of the embodiment according to the present invention.

Further, as shown in FIG. 6, the fixing projections 221 are formed by molding in such a manner that the fixing projections 221 are fitted in the mold 223 after molding and hence, the projections 221 are configured to make the removal of the light guide plate 120 from the mold 223 difficult. Accordingly, the fixing projections 221 have a chamfered shape. FIG. 9A and FIG. 9B are enlarged views of the fixing projection 221, wherein FIG. 9A is the perspective view and FIG. 9B is the cross-sectional view.

As shown in FIG. 9B, a tapered portion 225 is formed on a lower surface side of the fixing projection 221 which is formed on an upper surface 121 side of the light guide plate 120. Due to such a tapered portion 225, the resin can easily flow in the portion of the space for forming the fixing projection 221. Further, due to such a tapered portion 225, the fixing projection 221 can be easily separated from the mold 223 in the removal of the light guide plate 120 from the mold 223.

Numeral 224 indicates an ejector pin mark. The ejector pin mark 224 is a mark which is formed when the light guide plate 120 which is fitted in the mold 223 is removed by pushing the light guide plate 120 with the ejector pin. That is, the ejector pin mark is a slight indentation formed on the resin surface. Accordingly, the ejector pin mark 224 is formed in the direction opposite to the direction that the light guide plate 120 is removed. Further, the tapered portion 225 is also formed in the direction opposite to the direction that the light guide plate 120 is removed in the same manner as the ejector pin mark 224.

Here, the ejector pin mark 224 is also tapered. By also applying tapering or sand blasting to the ejector pin mark 224, it is possible to prevent a phenomenon that light is reflected on a corner portion of the ejector pin mark 224 and is radiated from the light guide plate 120 as undesired light.

Further, by applying tapering or sand blasting to the fixing projection 221 in the same manner as the ejector pin mark 224, it is also possible to prevent the generation of undesired light due to the reflection of light on a corner portion of the fixing projection 221. Still further, a mark formed on a portion of the light guide plate 120 by cutting off the filling port 222 may be also tapered in the same manner as the fixing projection 221. By applying tapering to the filling-port-222 cut-off mark, it is also possible to prevent the generation of undesired reflection of light due to the filling-port-222 cut-off mark.

Although the ejector pin mark 224 is formed outside a dotted line 226 which is an imaginary line indicative of an effective area, reflection-use grooves 126 are formed within the effective area so as to allow the light to be uniformly radiated toward the liquid crystal panel from the upper surface 121.

A stepped portion 229 may be formed outside a dotted line 226 indicative of the effective area thus forming a gap for accommodating an adhesive tape adhered to the lower surface in the stepped portion 229.

What is claimed is:

1. A liquid crystal display device comprising:

a liquid crystal panel; and a backlight which radiates light to the liquid crystal panel, wherein the backlight includes a plurality of light emitting elements and a light guide plate including a back-surface and a top-surface, light emitting elements are aligned along a light incident side surface of the light guide plate, two opposite side edge portions of the light guide plate extend in a direction perpendicular to the light incident side surface and are tapered such that a width of the light guide plate extending between the two opposite side edge portions is increased from the back-surface to the top-surface, a width of the top-surface of the light plate extending between the two opposite side edge portions is larger than a width of the back-surface of the light guide plate extending between the two opposite side edge portions;

an ejector pin mark is formed on a back-surface side of the light guide plate in the vicinity of at least one of the two opposite side edge portions and has a concave shape, and wherein a fixing projection is formed on the at least one of the two opposite side edge portions of a top-surface side of the light guide plate in the vicinity of the ejector pin mark.

2. A liquid crystal display device according to claim 1, wherein a corner portion of the ejector pin mark is chamfered.

3. A liquid crystal display device comprising:

a liquid crystal panel; and a backlight which radiates light to the liquid crystal panel, wherein the backlight includes a light guide plate and a plurality of light emitting diodes arranged along a light incident side surface of the light guide plate, the light guide plate is formed by injection molding and includes a back-surface and a top-surface, two opposite side edge portions of the light guide plate extend in a direction perpendicular to the light incident side surface and are tapered such that a width of the light guide plate extending between the two opposite side edge portions is increased from the back-surface to the top-surface, a width of the top-surface of the light guide plate extending between the two opposite side edge portions is larger than a width of the back-surface of the light guide plate extending between the two opposite side edge portions, an ejector pin mark is formed on the light guide plate on a back-surface side in the vicinity of at least one of the two opposite side edge portions and has a concave shape, and a fixing projection is formed on the at least one of the two opposite side edge portions of a top-surface side of the light guide plate in the vicinity of the ejector pin mark.

4. A liquid crystal display device according to claim 3, wherein a corner portion of the ejector pin mark is chamfered.

5. A liquid crystal display device according to claim 3, wherein the fixing projection is chamfered.

6. A liquid crystal display device comprising:

a liquid crystal panel; and a planar lighting device which radiates light to the liquid crystal panel, wherein the planar lighting device includes a light guide plate having a light radiation surface, a bottom surface which faces the light radiation surface in an opposed manner and side surface, a side surface of the light guide plate has an incident side surface on which a plurality of LEDs are mounted and through which light from the LEDs is incident on the light guide plate, a scattering member is provided on the bottom surface of the light guide plate for allowing light incident on the light guide plate to be directed toward a light-radiation-surface side, and to be radiated from the light radiation surface, two opposite side edge portions of the light guide plate extend in a direction perpendicular to the incident side surface and are tapered such that a width of the light guide plate extending between the two opposite side edge portions is increased from the bottom surface to the light-radiation-surface, a width of the light radiation surface of the light guide plate extending between the two opposite side edge portions is larger than a width of the bottom surface of the light guide plate extending between the two opposite side edge portions, an ejector pin mark is formed on the light guide plate on a bottom surface side of the light guide plate in the vicinity of at least one of the at least two opposite side edge portions and has a concave shape, and a fixing projection is formed on the at least one of the at least two opposite side edge portions on the light-radiation-surface side of the light guide plate in the vicinity of the ejector pin mark.

7. A liquid crystal display device according to claim 6, wherein a corner portion of the ejector pin mark is chamfered.

8. A liquid crystal display device according to claim 1, wherein the light guide plate has a trapezoidal shape in cross section with the tapered side edge portions.

9. A liquid crystal display device according to claim 3, wherein the light guide plate has a trapezoidal shape in cross section with tapered side edge portions.

10. A liquid crystal display device according to claim 6, wherein the light guide plate has a trapezoidal shape in cross section with tapered side edge portions.

11. A liquid crystal display device according to claim 1, wherein the ejector pin mark is provided in the vicinity of both of the two opposite side edge portions of the back-surface side of the light guide plate, and the fixing projection is provided in the vicinity of both of the two opposite side edge portions of the top-surface side of the light guide plate in the vicinity of the ejector pin mark.

12. A liquid crystal display device according to claim 3, wherein the ejector pin mark is provided in the vicinity of both of the two opposite side edge portions of the back-surface side of the light guide plate, and the fixing projection is provided in the vicinity of both of the two opposite side edge portions of the top-surface side of the light guide plate in the vicinity of the ejector pin mark.

13. A liquid crystal display device according to claim 6, wherein the ejector pin mark is provided in the vicinity of both of the two opposite side edge portions of the bottom-surface side of the light guide plate, and the fixing projection is provided in the vicinity of both of the two opposite side edge portions of the light-radiation surface side of the light guide plate in the vicinity of the ejector pin mark.

* * * * *